Jan. 18, 1966  L. G. SEIGEL ETAL  3,229,480
FLEXIBLE COUPLING
Filed Sept. 10, 1964  2 Sheets-Sheet 1
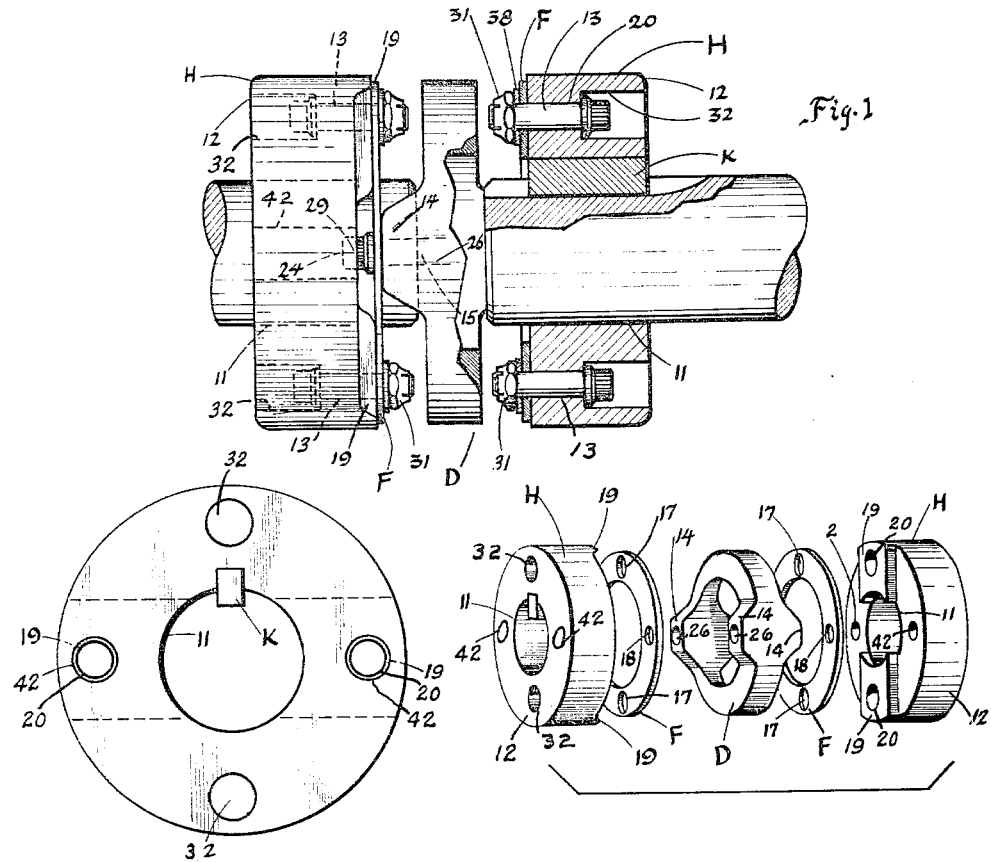
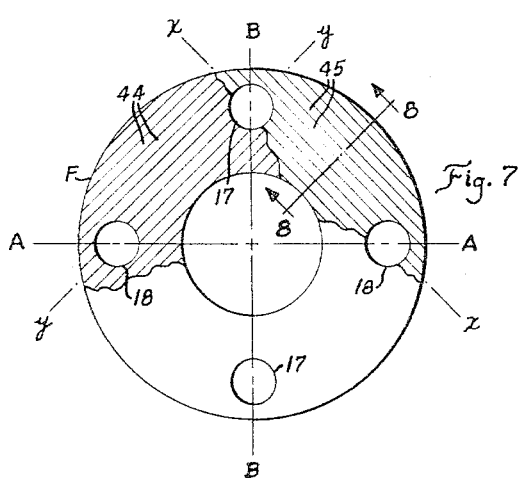
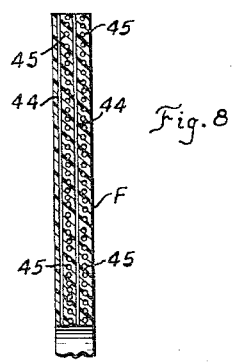
INVENTORS
LAWRENCE G. SEIGEL
STEPHEN STASENKO
BY
Charles L. Lovenluch
attorney

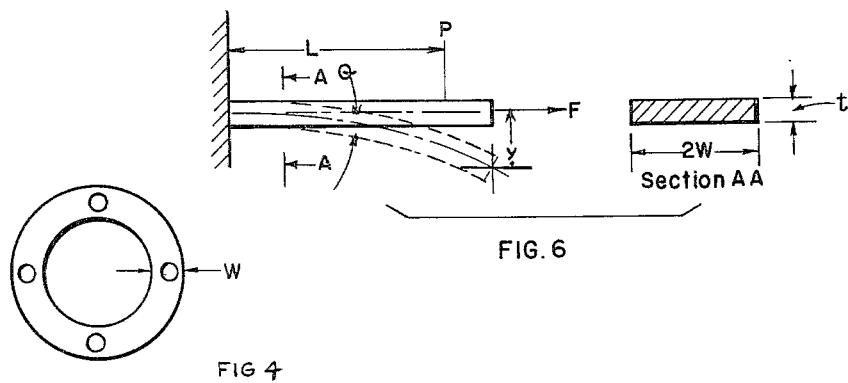
FIG. 6
FIG 4
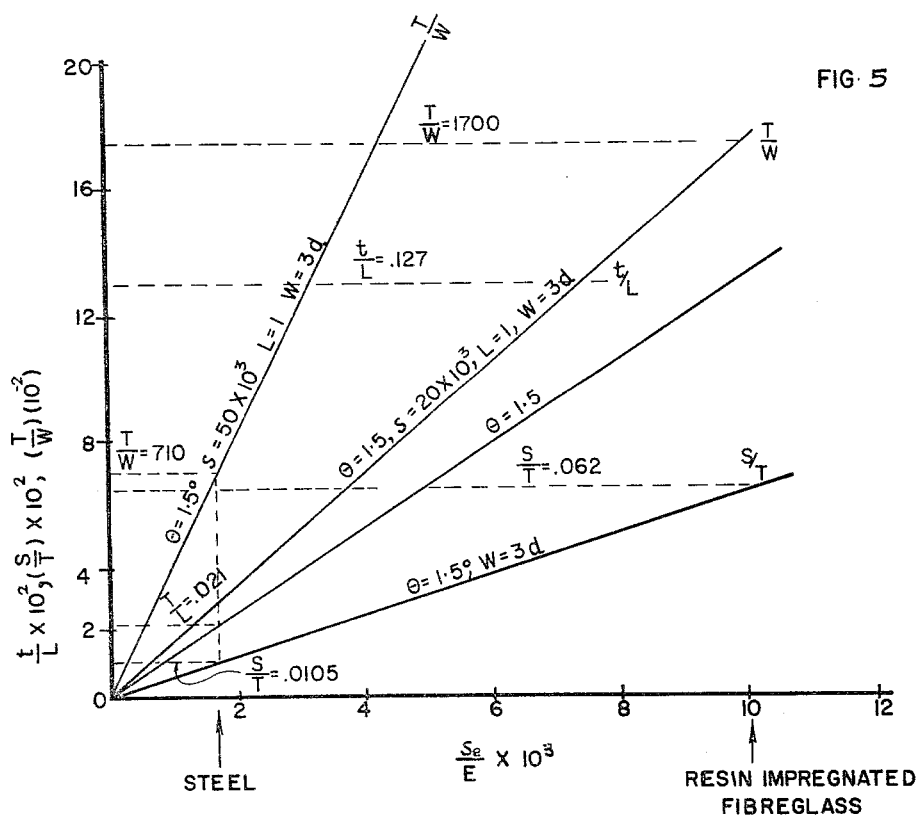
FIG. 5
$\frac{S_e}{E} = \frac{50 \times 10^3}{30 \times 10^6} = .0017$   $\frac{S_e}{E} = \frac{20 \times 10^3}{2 \times 10^6} = .01$
INVENTORS
LAWRENCE G. SEIGEL
STEPHEN STASENKO
BY
Charles L. Lovercheck United States Patent Office 3,229,480
Patented Jan. 18, 1966

3,229,480
FLEXIBLE COUPLING
Lawrence G. Seigel and Stephen Stasenko, Erie, Pa., assignors to Midland-Ross Corporation, Cleveland, Ohio, a corporation of Ohio
Filed Sept. 10, 1964, Ser. No. 397,065
2 Claims. (Cl. 64—13)

This application is a continuation-in-part of patent application, Serial No. 54,507, filed September 7, 1960, now abandoned, and of patent application, Serial No. 178,502, filed March 8, 1962, now abandoned.

This invention relates to flexible couplings and, more particularly, to flexible couplings for mechanically connecting a drive member to a driven member so that the drive member and driven member can be operated with their axes out of alignment with each other.

Generally, it is the object of the designer of flexible couplings to transmit maximum torque with minimum dimensions, with least misalignment stiffness, with large misalignment capacity, and without causing excessive torsional resiliency.

In a ring type flexible coupling of the type disclosed herein, the stress induced in the flexible member comes from two sources:

(1) misalignment which causes flexing or bending of the rings; and
(2) torque which causes normal tensile or compressive stresses in the ring.

It is the appropriate combination of these stresses which requires the flexing material to have a ratio of the endurance limit (pounds per square inch) to modulus of elasticity (pounds per square inch) between .005 and .02. In determining this ratio, the endurance limit and the modulus of elasticity must be expressed in the same units, thereby cancelling out, leaving a dimensionless ratio.

In a ring type coupling like that disclosed, all types of misalignment result in a similar beam like flexure of the rings. For purposes of analysis, the rings may be considered to be cantilever beams and the stresses resulting from flexure may be estimated from familiar beam equations. In addition to these flexural stresses due to misalignment, the stresses due to the torque carried by the coupling are the result of forces which act normal to the cross section of the ring element. These stresses may be estimated by use of familiar normal stress equations for tension and compression. The combined stresses from these two sources will determine the performance characteristics of a ring type coupling.

It is, accordingly, an object of the present invention to provide an improved flexible coupling.

Another object of the invention is to provide a coupling having misalignment characteristics covering a range of values not possible with the use of flexing elements commonly used for coupling design.

Still another object of the invention is to provoide a coupling using a flexing element having a ratio of the endurance limit (pounds per square inch) to modulus of elasticity (pounds per square inch) between .005 and .02.

A further object of the invention is to provide a coupling which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIGURE 1 is an assembly view partly in cross section showing a typical flexible power transmission coupling with the upper portion thereof in section;

FIGURE 2 is an end view of the hub shown in FIGURE 1;

FIGURE 3 is an exploded view of the coupling;

FIGURE 4 is a schematic side view of the flexing member;

FIGURE 5 is a graph showing optimum parameters for a ring coupling;

FIGURE 6 is a schematic view of a coupling ring shown stressed as a cantilever beam in cross section; and FIGURES 7 and 8 represent the coupling ring in partial section and plan views showing one mode of glass fiber orientation.

Now with more specific reference to the drawings, FIGURE 1 shows a flexible power transmission coupling having two hubs H, one being fixed to a driven shaft and the other fixed to a driving shaft by means of keys K. The hubs H are hollow cylindrical members which each have a shaft receiving bore 11 in which the shaft can be suitably attached in a manner familiar to those skilled in the art. The hubs H have two diametrically spaced bosses 19 adjacent the periphery thereof and raised from the hub inside end surface to support flexing elements F. The hubs H also have enlarged diametrically disposed openings 32 adjacent their peripheries and spaced ninety degrees from bosses 19. Heads 24 of bolts 15 can freely move in the openings 32.

Between the spaced hubs H in FIGURE 1 is disposed a flexible assembly made up principally of the flexing members F and a holding device D. The flexible assembly is the part of the coupling which compensates for misalignment between the driving shaft and the driven shaft attached to the hubs H.

The flexible assembly is shown by way of example as consisting of two flexing members F. A coupling having a single flexing member could be used but it would not allow for parallel misalignment between the two shafts. Therefore, to most specifically carry out this invention, a holding device D is shown which is in the form of a rigid annular disk flat on each side and having spaced bosses 14 raised from each surface. Although this annular form is illustrated in FIGURE 1, it is not the only form of holding device which can be used. Any continuous, relatively "rigid" member such as a bar between flexing members is satisfactory.

In the present embodiment, the flexing members are shown as made in the form of flat ring like members having a central bore and two diametrically spaced holes 17 which receive the bolts 15. Two other diametrically spaced holes 18 each ninety degrees from the holes 17 receive bolts 13.

The holding device D is clamped between the flexing members F by bolts 15 having heads 29 and nuts. Preferably, the bolts 15 form a close fit in their holes 26 in the holding device D so that the holding device D and the bolt 15 act essentially as a unit.

The flexing members F are fixed to the hubs H by diametrically spaced bolts 13 which extend through holes 20. The hubs H and the flexing members F are clamped together by the bolts 13 and nuts 31 having washers 38 thereunder.

It has been discovered by the inventors and proved by laboratory and field tests that use of a flexing ring which has a unique combination of physical properties falling within the claimed range results in a vast and unexpected improvement in performance of this type of coupling. Study of the test data has resulted in the following mathematical analysis which demonstrates that the source of the improvement resides in the invention claimed herein and demonstrates also the extensiveness of the improvements possible as a result of this invention. Symbols used are as follows:

A—sectional area of beam or coupling ring
E—modulus of elasticity of beam or ring material
F—force at bolt causing normal stress in coupling ring (torque force applied normal to ring cross section by the driving bolt)
I—moment of inertia of beam or ring section
L—length of beam from support to load
M—moment in beam or half ring due to deflection
P—force at bolt resulting from beam or ring deflection
S—coupling ring misalignment stiffness
T—shaft torque inch-pounds
C—distance from neutral axis of beam or ring to outside fiber$=t/2$
d—diameter of bolt hole in beam or ring at support
w—width of coupling ring
t—thickness of beam or ring
y—deflection of beam or ring at load P
θ—angle resulting from beam or ring deflection
$s_M$—normal stress due to misalignment or deflection
$s_e$—endurance limit (or fatique strength) of coupling ring material
$s_T$—normal stress due to coupling torque
$s_B$—stress in bearing at the bolt
s—combined stress due to deflection and torque Referring now to FIGURES 5 and 6, force P represents the force required to produce (or resulting from) misalignment and force F is proportional to the torque transmitted. The dimensions $w$, $t$, and $L$ may be varied by design but when making comparisons of one material against another, it may be convenient that these dimensions should be the same for all materials.

The equations for stress and deflection are as follows:

$$s_M = \frac{MC}{I} = \frac{Mt}{2I}$$

and $$y = \frac{PL^3}{3EI} = \frac{ML^2}{3EI}$$

Then $$s_M = \frac{3EIyt}{2IL^2} = \frac{1.5Eyt}{L^2}$$

where $y$, deflection, is in inches. If deflection is in degrees, $$y = L \sin \theta \text{ and } s_M = \frac{1.5Et \sin \theta}{L}$$

For small angles, $\sin \theta = .0175\theta$ and $$s_M = \frac{.0263\theta Et}{L} \quad (1)$$

The normal stress due to torque is $$s_T = \frac{F}{A} = \frac{F}{wt}$$

or, at the bolt hole $$s_T = \frac{F}{t(w-d)} \quad (2)$$

The combined stress ($s_M + s_T$) will be of interest in the coupling design and it may be obtained by addition of Equations (1) and (2) as follows:

$$s = s_M + s_T$$
$$s = \frac{.0263Et\theta}{L} + \frac{F}{t(w-d)} \quad (3)$$

Equation 3 may be used to determine the maximum stress developed in a coupling ring for particular dimensions and specific conditions of operation. It may be observed, however, that the stress given by Equation 3 has a minimum value for some particular value of ring thickness $t$. Therefore, it will be desirable to design a coupling with this optimum ring thickness so that minimum stress will result for the loads applied and the ring material will be used most efficiently. To obtain an expression for this optimum thickness, Equation 3 may be differentiated. Then $ds/dt$ may be set equal to zero to find the minimum stress in terms of $t$.

By differentiation of Equation 3, the following is obtained:

$$ds = .0263 \frac{\theta E dt}{L} - \frac{F}{(w-d)} \frac{dt}{t^2}$$

Then $$\frac{ds}{dt} = .0263 \frac{\theta}{L} E - \frac{F}{(w-d)t^2} = 0$$

and $$t = \left[ \frac{38FL}{(w-d)\theta E} \right]^{1/2} \quad (4)$$

Equation 4 gives the optimum value of $t$ which will result in minimum stress in a given material but it does not necessarily utilize the stress capability of the material unless F is chosen properly. It is therefore necessary to obtain an expression for F in terms of the maximum stress that may safely be applied to the coupling ring. This maximum allowable stress is the fatigue strength or endurance limit, $s_e$, for the ring material. Now, if it is recognized that $s_T = s_M$ when the stress is a minimum (this statement may be proved mathematically or may be easily checked by solving for $s_M$ and $s_T$ using the value of $t$ found by Equation 4), the maximum value for F may be found from Equation 3 as follows:

$$s_e = 2s_T = \frac{2F}{(w-d)t}$$

or $$F = \frac{s_e(w-d)t}{2}$$

and using this value of F in Equation 4 gives:

$$t = \frac{19Ls_e}{\theta E}$$

or $$t/L = (19/\theta)(s_e/E) \quad (5)$$

Equation 5 is very useful since it affords the calculation of coupling ring dimensions in terms of ring physical properties without reference to coupling torque. In effect, Equation 5 determines the optimum ring thickness which should be used for design.

Equation 5 may also be expanded to obtain an expression for transmitted torque in terms of ring width as follows:

At optimum ring thickness, the effective stress capability of the material that can be used for transmitting torque is $s_e/2$ and, therefore, the force which can be applied normal to the ring section by the bolt is:

$$F = \frac{s_e}{2}(w-d)t$$

and if $d = w/3$ $$F = \frac{s_e wt}{3}$$

The coupling torque, T, will be 2FL or $$T = \frac{2s_e wtL}{3}$$

or $$t = \frac{3T}{2s_e wL}$$

and $$L = \frac{3T}{2s_e wt} \quad (5a)$$

Then by substitution of $t$ from Equation 5a in Equation 5

$$\frac{3T}{2s_e wL} = \frac{19s_e L}{\theta E}$$

and $$\frac{T}{W} = \frac{12.6 s_e L^2}{\theta} \frac{(s_e)}{E} \quad (5b)$$

The thickness selected from Equation 5 may not result in the desired misalignment stiffness. It is necessary, therefore, to obtain a further expression for thickness which involves the force required to produce misalignment. This expression may be derived from the deflection equation as follows:

$$y = \frac{PL^3}{3EI} = L \sin \theta = .0175 L\theta$$

and if $I$ is approximated as $2wt^3/12$, then $$.0175\theta = \frac{12PL^2}{6wEt^3}$$

or $$t = \left[\frac{116 PL^2}{\theta E w}\right]^{1/3} \quad (6)$$

The coupling ring misalignment stiffness, $S$ (for angular misalignment), will be twice the moment per beam (half ring) required to produce the misalignment. Therefore $$S = 2PL \text{ or } PL = \frac{S}{2}$$

and Equation 6 may be written as:

$$t = \left[\frac{58 SL}{\theta E w}\right]^{1/3} \quad (7)$$

Since the thickness selected by Equation 5 must be the same as that selected by Equation 7 so that both proper stiffness and effective use of material properties will be obtained, it is appropriate to combine Equations 5 and 7 to obtain another expression which does not involve thickness. This is for a single ring coupling; that is, $\theta$ for the rings is $\theta$ for the coupling. For a double ring coupling, the stiffness will be one-half the value. Thus, $$\frac{19 L s_e}{\theta E} = \left[\frac{58 SL}{\theta E w}\right]^{1/3}$$

$$w^2 L = \frac{S(\theta E)^2}{118 s_e^3} \quad (8)$$

Equation 8 is an expression which gives dimensional information in terms of coupling requirements and material properties. This equation may be further developed into a useful dimensionless relation for misalignment moment in terms of transmitted torque as follows:

By substitution of $L$ from Equation 5a in Equation 8

$$\frac{3TLw}{2s_e wt} = \frac{S(\theta E)^2}{118 s_e^3}$$

$$S/T = \frac{1.5 \times 118 s_e^2 L}{t(\theta E)^2}$$

and by substitution of Equation 5 for $t$ $$S/T = \frac{9.3}{\theta} \frac{(s_e)}{E} \quad (8a)$$

To illustrate the effect of ring physical properties on coupling performance, a number of computations have been made for couplings of various dimensions and requirements. The results of these calculations are shown herein. Also, FIGURE 5 illustrates the effect of material properties on coupling flexible ring performance. Study of the data in FIGURE 5 will reveal the startling improvement in flexing ring couplings which is made possible by the discovery of the critical range of the dimensionless ratio $s_e/E$ which is revealed herein and which forms the basis herein using flexing rings falling within this heretofore unused critical range of $s_e/E$ between .005 and .02.

FIGURE 5 illustrates the desirability of using flexing rings with high $s_e/E$ ratio by demonstration of the fact that a flexing ring with high $s_e/E$ ratio can be used for effective coupling design over a wide range of misalignment stiffness values. For example, in calculation 4 of the graph shown in FIGURE 5, a flexing ring with $s_e/E = .01$ could be used for a coupling with $L = 1''$ and a misalignment stiffness of 7.5 inch pounds and could transmit 1,120 inch pounds of torque. A flexing ring with $s_e/E = .0017$ (steel) could also be used for the same size coupling and at the same misalignment stiffness but would transmit only 710 inch pounds torque.

If, however, a misalignment stiffness of 105 inch pounds were desired (for reference as to magnitudes, tests have shown that gear type couplings of about the size being considered would have a misalignment stiffness of 140 inch pounds), the coupling with $s_e/E = .01$ would transmit 1700 inch pounds (see calculation 5) and the coupling with $s_e/E = .0017$ (steel) could not carry any torque at all because the stress due to misalignment above would be greater than the allowable stress. Therefore, it is evident that a high $s_e/E$ ratio leads to wider latitude of design.

Another illustration of the advantage of high $s_e/E$ ratio is given in the graph (calculation 3) were couplings of the same torque capacity are compared. For a coupling of 1700 inch pounds torque using a flexing ring with $s_e/E = .01$, $L$ will be one inch whereas if a flexing ring of $s_e/E = .0017$ is used, $L$ will be 1.56 inches. This means that the coupling using $s_e/E = .0017$ flexing ring would be about one and one-half times the diameter (and about two and one-half times the weight) of the coupling using $s_e/E = .01$ flexing ring.

It might be presumed that continued improvement in coupling design will result from use of flexing rings with greater $s_e/E$ values. This is not the case, however, because at values of $s_e/E$ approaching .02, the elongation of the coupling ring in its tension portion becomes so great that the parts of the ring under compression cannot accept the strain without buckling. When this buckling occurs, excessive bending stresses occur in the rings and failure will follow. Therefore, it is not desirable to exceed a value of $$\frac{s_e}{E} = .02$$

for good coupling performance. (If the compression section of the ring is omitted, the coupling will not be reversible and cannot accommodate pulsating loads.)

Based on experience and the computations presented herein, optimum ring type coupling performance will result when $s_e/E$ is approximately .01. Acceptable performance may result within the limits of .005 to .02 and to meet special requirements, it may be desirable to use values anywhere within this range.

Therefore, this invention relates specifically to flexing rings having $s_e/E$ values between .005 and .02 which are used to obtain optimum coupling performance in accordance with the equations contained herein. Specifically, these equations for optimum performance are:

$$\frac{t}{L} = \frac{12}{\theta} \frac{s_e}{E}$$

$$\frac{S}{T} = \frac{9.4}{\theta} \frac{s_e}{E}$$

$$\frac{T}{W} = \frac{12.6}{\theta} s_e L^2 \frac{s_e}{E}$$

Maximum tensile strength is desirable in couplings because it results in the smallest diameter coupling or the greatest torque transmission for a given diameter. This can be achieved by a proper choice of material. One such material is the inorganic fiber spun from glass. Advantageously, it is an optimum material inasmuch as it has very high tensile strength and, when in fiber form and embedded in a preferred binder, it will take compression. Glass fibers then, when properly aligned and in suitable layers and held in place by a proper binder, as an epoxy resin, yield an optimum disk or ring for use in couplings.

As shown in FIGURES 7 and 8, glass fibers have been discovered to form excellent coupling members. Glass fiber has an excellent tensile strength and, when held in a good binder, it will also take adequate compression stresses. For maximum strength, the fibers 44, 45 should be of continuous length and preferably they should be arranged as parallel nonwoven layers (see enlarged FIGURE 8), and laid to prevent abrasion during flexing of ring F. Such orientation of the fibers in noncontacting layers is important since it contributes through avoidance of abrasion to the performance life of the coupling. For most effective stress distribution in a coupling ring made of glass fibers, the fibers should be laid on axes $x$ and $y$ as in FIGURE 7 in a direction of the bolt holes 17, 18 of the ring. The flectional stresses are carried by the continually long fibers 44, 45 providing continuous fiber support of the load. However, if the fibers are oriented in other angular directions, they will continue to provide for good load support but not quite the optimum. Glass fibers embedded in an epoxy resin advantageously fall within the range of an $s_e/E$ value of about .01.

The requirement for maximum compression strength in a coupling ring is because of stress developed at the bolts. This cannot be met solely by the fibers since they must be supported in the ring and since they, by themselves, are essentially members in tension. When, however, the fibers are embedded in a desirable binder, they will take compressive forces. Therefore, the choice of a binder or resin to hold the fibers in a preferential position is in itself quite important. Ideally, a desirable binder would also have a very high compressive strength and a high modulus of elasticity in compression, but it would also have a low modulus of elasticity in tension and bending. Rubber is one but its absolute values of its properties are low. Of the various types of binders tested, it has been found that the epoxy resins are more suitable than others, and are preferred. As binders with still more desirable compression strength and modulus are developed, it should be possible to develop even better coupling rings with the use of high strength fibers of glass.

The discussion of flexible couplings herein has been developed for solid rings. If laminated rings are used, some advantages of performance may be obtained but the relative effects of flexing ring physical properties will remain the same. Therefore, the conclusions determined above remain valid.

In the case of laminated ring couplings, it is advantageous to use the same relations and parameters as have been derived herein but these relations should be altered to include the effect of the number of laminations, N, as follows:

$t/L$ remains the same as for single solid rings.

$T/w$ is the same per ring. Therefore, $T/w$ for the coupling is $N$ times $T/w$ for a solid ring.

$S/T$ is the same per ring. Therefore, $S/T$ for the coupling is $N$ times $S/T$ for a solid ring.

It will be seen that by using a flexing ring wherein its properties are such that the radio of its endurance limit to modulus of elasticity is between the limits set forth, a coupling having smaller dimensions can be designed for a given application than if a flexing ring such as that of steel is used which has a ratio of properties on the lower side of the specified range. The same is true in a flexing ring having a ratio of properties above the range specified.

The foregoing specification sets forth the invention in its preferred practical forms but it is understood that the structure shown is capable of modification within a range of equivalents without departing from the invention which is to be understood as broadly novel as is commensurate with the appended claims.

The embodiments of the invention in which an exclusive property or privilege is claimed are defined as follows:

1. A flexible coupling comprising spaced first and second hubs, a flexible member between said hubs, means attaching said first hub to a part adjacent the outer edges of said flexing member, means attaching said second hub to said flexing member, and said flexing member being in the form of a relatively thin element of resin bound unwoven inorganic fibers laid in noncontacting generally parallel relation and being continuous in length across the element, said flexing member having a ratio of endurance limit to modulus of elasticity of about .01, the same being a dimensionless ratio.

2. The coupling recited in claim 1 wherein said means to attach said flexing member to said second hub comprises a relatively rigid holding member between said flexing member and said second hub, at least a second flexing member between said holding member and said second hub, means attaching said holding member to said first and second flexing members, and means offset circumferentially from said first mentioned means attaching said second flexing member to said second hub.

References Cited by the Examiner

UNITED STATES PATENTS

| 1,647,114 | 10/1927 | MacDonald | 64—13 |
| 2,182,711 | 12/1939 | Thomas | 64—13 |
| 2,784,575 | 3/1957 | Jencick | 64—13 |
| 3,062,025 | 11/1962 | Bastow et al. | 64—13 |

FOREIGN PATENTS

| 540,283 | 4/1922 | France. |

BROUGHTON G. DURHAM, *Primary Examiner.*

ROBERT C. RIORDON, *Examiner.*

H. C. COE, *Assistant Examiner.*